(12) United States Patent
Irvin et al.

(10) Patent No.: US 11,885,457 B2
(45) Date of Patent: Jan. 30, 2024

(54) METHOD OF MANUFACTURING SPACERS FOR PIPE-IN-PIPE SYSTEMS AND SPACER FOR A PIPE-IN-PIPE STRUCTURE

(71) Applicant: Acergy France SAS, Suresnes (FR)

(72) Inventors: David James Irvin, San Marcos, TX (US); Alysa Marie Joaquin, Austin, TX (US); Alan Douglas Sakaguchi, San Antonio, TX (US); Garrett David Poe, Austin, TX (US); Liu Yang, Houston, TX (US)

(73) Assignee: Acergy France SAS, Suresnes (FR)

( * ) Notice: Subject to any disclaimer, the term of this patent is extended or adjusted under 35 U.S.C. 154(b) by 166 days.

(21) Appl. No.: 17/278,250

(22) PCT Filed: Sep. 18, 2019

(86) PCT No.: PCT/IB2019/001267
§ 371 (c)(1),
(2) Date: Mar. 19, 2021

(87) PCT Pub. No.: WO2020/058768
PCT Pub. Date: Mar. 26, 2020

(65) Prior Publication Data
US 2021/0356067 A1 Nov. 18, 2021

(30) Foreign Application Priority Data

Sep. 20, 2018 (GB) ..................... 1815309

(51) Int. Cl.
*F16L 59/12* (2006.01)
*B29B 7/00* (2006.01)
(Continued)

(52) U.S. Cl.
CPC .............. *F16L 59/12* (2013.01); *B29B 7/002* (2013.01); *B29C 45/0001* (2013.01); *B29C 45/0013* (2013.01); *B29C 45/14336* (2013.01); *B29C 45/14598* (2013.01); *F16L 9/18* (2013.01); *B29K 2105/16* (2013.01); *B29K 2479/08* (2013.01); *B29L 2023/225* (2013.01)

(58) Field of Classification Search
CPC ............ B29C 45/0001; B29C 45/0013; B29C 45/14598; F16L 59/12
See application file for complete search history.

(56) References Cited

U.S. PATENT DOCUMENTS 6,145,547 A 11/2000 Villatte
7,226,243 B2 6/2007 Lee et al.
(Continued)

FOREIGN PATENT DOCUMENTS

WO WO 2006/074463 7/2006
WO WO 2007/057695 5/2007
WO WO 2013/000861 1/2013

*Primary Examiner* — Stella K Yi
(74) *Attorney, Agent, or Firm* — MATTINGLY & MALUR, PC (57) ABSTRACT

A method manufacturing a spacer for a pipe-in-pipe system includes mixing aerogel particles with a polymer to form a mixture in which the particles are dispersed in the polymer. The resulting mixture is moulded and the polymer is solidified to form the spacer or a component of the spacer, in which the dispersed, particles are suspended in a matrix of the solidified polymer.

21 Claims, 6 Drawing Sheets

(51) Int. Cl.
   *B29C 45/00* (2006.01)
   *B29C 45/14* (2006.01)
   *F16L 9/18* (2006.01)
   *B29K 105/16* (2006.01)
   *B29K 479/00* (2006.01)
   *B29L 23/00* (2006.01)

(56) References Cited

U.S. PATENT DOCUMENTS

| | | |
|---|---|---|
| 7,318,453 B2 | 1/2008 | Hoffmann |
| 2003/0077438 A1 | 4/2003 | Frank et al. |
| 2006/0196568 A1 | 9/2006 | Leeser et al. |
| 2006/0237084 A1* | 10/2006 | Hoffmann ................. F16L 7/00 138/108 |
| 2009/0082479 A1 | 3/2009 | Cho |
| 2014/0128488 A1 | 5/2014 | Lotti et al. |

* cited by examiner

METHOD OF MANUFACTURING SPACERS FOR PIPE-IN-PIPE SYSTEMS AND SPACER FOR A PIPE-IN-PIPE STRUCTURE

This invention relates to pipelines of pipe-in-pipe ('PiP') construction as used in subsea applications. The invention relates particularly to centralisers or spacers that maintain an annular gap between inner and outer pipes of a PP system. The invention addresses the requirement to maximise the thermally-insulating properties of such spacers.

Subsea pipelines are used in oil and gas production as 'tie-backs' to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters the pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high, typically above 65° C. and in some cases above 200° C., despite thermal exchange with seawater which, for example, is at 4° C. below 1000 m depth.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever a pipeline.

A well-known approach to thermal management in a pipeline is to adopt a PiP structure comprising a fluid-carrying inner flowline pipe positioned concentrically within an outer pipe. The inner and outer pipes may be of steel or composite material, or one pipe may be of steel and the other pipe may be of composite.

The pipes of a PiP structure are spaced from each other to define a thermally-insulating annulus between them. Typically, a solid thermally-insulating material is disposed in the annulus, such as blanket insulation wrapped around the inner flowline pipe. It is also common to draw down a partial vacuum in the annulus to reduce transmission of heat through the annulus, as exemplified by U.S. Pat. No. 6,145,547. By virtue of such measures, PiP structures provide high-performance thermal insulation. Their double-walled construction also enhances mechanical strength and leak protection.

PiP structures may be fabricated offshore on, and laid from, a pipelaying vessel using J-lay or S-lay techniques. PiP structures may also be laid in reel-lay operations, in which a pipeline prefabricated onshore is spooled onto a reel of a vessel to be unspoiled from the reel and straightened at an installation site offshore.

The thickness of flowline insulation in the annulus of a PiP structure is significant because for a given diameter of outer pipe, thicker insulation requires the diameter of the inner pipe to be smaller and hence will reduce the flow capacity of the PiP structure. Conversely, if the diameter of the inner pipe is to be maintained, thicker insulation requires the diameter of the outer pipe to be increased. This adds weight, increases cost, complicates handling and takes up more space on board the pipelaying vessel. It is therefore desirable to reduce the overall heat loss in the system to minimise the thickness of flowline insulation that is required and hence to allow the inner pipe diameter to be maximised relative to the outer pipe diameter.

PiP structures are typically made from rigid pipe. Despite its name, a rigid pipe has flexibility to bend along its length so as to be spooled or to hang in a catenary shape during installation. Yet, rigid pipes are to be distinguished from flexible pipes as those terms are understood by persons skilled in the art. Flexible pipes comprise multiple layers that allow a much smaller minimum bend radius than rigid pipes.

An unsupported span of the inner pipe of a PiP structure has sufficient flexibility to bend along its length relative to the outer pipe, for example under the influence of gravity during installation, or when spooling or unspooling. Lateral movement of the inner pipe relative to the outer pipe could therefore narrow the annulus or could crush any insulating material in the annulus, hence reducing the local effectiveness of thermal insulation. The inner pipe could even contact the outer pipe, hence creating a path for heat loss by thermal conduction. Contact between the inner pipe and the outer pipe may also hinder relative longitudinal movement between them due to differential thermal expansion in use of the structure.

For these reasons, lengthy PiP systems typically comprise a series of annular centralisers or spacers that are distributed longitudinally along the annulus to maintain a minimum spacing and substantial concentricity between the inner pipe and the outer pipe. Spacers may be subjected to very high mechanical loads during installation and use of a PiP structure.

A typical PiP spacer, as exemplified in WO 2007/057695, comprises components of solid nylon or polypropylene that are assembled together around an inner pipe. The inner pipe may also be wrapped with blanket insulation. Conveniently, the assembly of the inner pipe, insulation and one or more spacers is then inserted into an outer pipe.

As spacers require simultaneous contact with the inner pipe and the outer pipe to transfer mechanical forces between those pipes, they also create a risk of bridging the annulus thermally and hence transferring heat away from the inner pipe. In this respect, it is important to maintain thermal management continuously along the length of a pipeline. Otherwise, 'cold spots' will arise, which increases the likelihood of plugs forming at those locations.

Whilst spacers constitute only a small percentage of the total surface area of a PiP pipeline, the thermal losses attributable to them are significant. Indeed, some measurements indicate that 10% or more of overall heat loss from a PiP pipeline may be attributed to heat transfer through the spacers.

Thermal insulation favours a vacuum, a void or a gaseous material, whereas mechanical strength favours a solid, compact material. Thus, the design of a spacer for a PiP system involves a trade-off between mechanical strength and thermal insulation. It follows that spacers typically have high thermal conductivity relative to the dedicated, non-structural insulation materials that may also be positioned in the annulus.

One approach to reducing heat loss through spacers in PiP structures is to make them of materials with lower thermal conductivity than conventional spacer materials. For example, highly porous materials such as foams typically exhibit lower thermal conductivity than fully densified materials. However, as the porosity level increases, there is a usually a corresponding decrease in mechanical strength. Thus, using a highly porous material of low thermal conductivity produces a spacer that may be unable to withstand the high mechanical loads typically experienced in use.

Another approach to reducing heat loss is to modify the cross-sectional geometry of the spacer to minimise the area of surface contact with the inner and/or outer pipes. This undesirably weakens the spacer and concentrates mechanical loads at the interface between the spacer and the inner and/or outer pipes.

In view of these challenges, various proposals have been made for PiP spacers to have composite structures in which different parts of different materials address the conflicting mechanical and thermal requirements of the spacer.

In U.S. 7,226,243, for example, the functions of thermal insulation and mechanical resistance are divided between distinct elements, namely a light helically-wound metallic spacer body and a layer of aerogel disposed between the spacer body and the inner pipe. The main role of the spacer body is to provide mechanical strength whereas the main role of the aerogel layer is to provide thermal insulation. However, this solution is complex to manufacture. Also, all mechanical loads borne by the spacer body must pass through the aerogel layer. Aerogel is ill-suited to bear such loads and therefore the aerogel layer must be kept thin, to the detriment of its performance as a thermal insulator.

WO 2006/074463 is similar, insofar as it proposes a PiP arrangement in which an insulating layer is interposed between an inner pipe and a metallic, helical spacer. In this case, the insulating layer is formed from a reinforced aerogel that is configured for resistance to compression, such as the material described in U.S. 6,887,563.

In U.S. 7,318,453, a spacer comprises a shaped, unitary body of aerogel insulation that is covered by or contained in a hollow casing of polymer material. A drawback of this proposal is the complexity of manufacturing the spacer in such a way as to combine both materials. For example, if the polymer casing cannot withstand temperatures used for manufacturing aerogel, it cannot be used as a mould for filling with aerogel. Conversely, as a body of aerogel is fragile and susceptible to crushing, manufacturing the casing over the aerogel may damage the aerogel.

In use of a PiP system, heat will usually transfer through the annulus from a radially inner side of a spacer to a radially outer side of the spacer. In U.S. 7,318,453, the polymer casing around the aerogel defines a heat transfer path that is direct, straight and short. Consequently, like the solid nylon body of WO 2007/057695, the polymer casing of U.S. Pat. No. 7,318,453 is sub-optimal as an insulator and provides a heat transfer path that readily bypasses the thermally-insulating aerogel core.

Against this background, the invention resides in a method of manufacturing a spacer for a pipe-in-pipe system. The method comprises: mixing a filler of aerogel particles with a polymer to form a mixture in which the particles are dispersed in the polymer; moulding the resulting mixture; and curing or otherwise solidifying the polymer in the moulded mixture to form the spacer or a component of the spacer, in which the dispersed particles are suspended in a matrix of the solidified polymer.

The particles may be mixed with the polymer when the polymer is in a liquid form. For example, a thermoset polymer may be heated and/or catalysed to solidify the polymer after moulding the mixture. Alternatively a thermoplastic polymer may be melted and the particles may be mixed with the molten polymer.

It is also possible to mix the particles with a thermoplastic polymer when the polymer is in a granular form, and then to melt the polymer. Where the polymer is molten, the mixture is suitably cooled after moulding to solidify the polymer.

Where the method of the invention is used to manufacture a component of a spacer, the method suitably further comprises assembling that component with one or more other components of the spacer to assemble the spacer around a pipe.

The mixture may instead be moulded around a pipe to form the spacer around the pipe. For example, the method may involve: encircling the pipe with a mould; filling the mould with the mixture; solidifying the polymer of the mixture; and removing the mould from the pipe.

A wide range of temperatures and pressures are possible for mixing and solidification, depending upon the composition of the polymer matrix. For example, mixing with a thermoset matrix may be performed at a temperature of between −50° C. and +200° C., depending on a number of factors. Solidification of a thermoset matrix generally requires some heating, for example to a temperature of between 30° C. and 200° C.

Mixing with a thermoset matrix and solidification of a thermoset matrix may also be performed under reduced pressure to reduce entrapped bubbles, for example at a pressure of from $1\times10^{-7}$ MPa up to 0.101 MPa (1 atmosphere). However, it is possible that mixing and solidification could be performed under a higher pressure.

Mixing with a thermoplastic matrix generally requires high temperature, for example from 250° C. to 400° C., and often high pressure, for example from 0.101 MPa (1 atmosphere) up to 350 MPa, For solidification of a thermoplastic matrix, the mould can be chilled below room temperature, kept at room temperature, or heated to an elevated temperature such as 200° C. The pressure in the mould could be very high, for example up to 350 MPa.

The inventive concept also embraces a spacer for a pipe-in-pipe structure, or a component of such a spacer, comprising dispersed particles of aerogel embedded in a matrix of a stabilized polymer.

The particles of the filler may have a diameter of between 5 μm and 500 μm and preferably of between 25 μm and 125 μm. The filler may constitute between 5% and 50% by volume, and preferably between 10% and 30% by volume, of the mixture and hence of the finished spacer or component.

The inventive concept extends to a pipe-in-pipe structure that comprises at least one spacer of the invention or that is made by the method of the invention.

Embodiments of the invention implement a method for manufacturing a thermally-efficient spacer for a pipe-in-pipe structure. The method comprises the steps of mixing aerogel-based powder with a polymer matrix; and moulding the resulting mixture, for example by injection moulding or pouring.

The aerogel-based powder may take various forms. For example, the aerogel-based powder may comprise polyimide aerogel particles or may be as offered by Blueshift Materials, Inc. under the registered trade marks Blueshift AeroZero.

The polymer matrix may be any one or more of epoxy, nylon, polyester, vinyl ester, polypropylene or dicyclopentadiene (DCPD).

The mould used to form the spacer may be shaped as a full or partial ring or annulus. For example, the spacer may be injection-moulded in at least two parts that are subsequently assembled together around the inner pipe. Alternatively the spacer may be injection-moulded in situ around the inner pipe.

In summary, the invention concerns a centraliser or spacer that may be used in subsea PiP flowline applications. The spacer may be formed from polyimide aerogel particles dispersed in epoxy, nylon, polyester, vinyl ester, polypropylene or DCPD matrices or may be made from a resin filled with a powder of aerogel material such as Blueshift AeroZero powder. The thermally-insulating powder may be compounded into epoxy, nylon, polyester, vinyl ester, polypropylene or DCPD, or other thermoplastic or thermoset polymers, and moulded or injection-moulded into a final part.

Polymer aerogel such as polyimide aerogel has low thermal conductivity relative to bulk plastics such as nylon and polypropylene. The low thermal conductivity of the aerogel is attributable to at least its high level of porosity, which is often 80% or higher. The inventors have found that blending polymer aerogel particles into polymer materials used to make centralisers or spacers results in significantly lower thermal conductivity of the resulting material without a correspondingly significant decrease in its mechanical strength.

In a binary system of the invention, the net heat flow is determined by the volume fraction and thermal conductivity of each component. While heat flows faster and more readily though the continuous matrix than through the aerogel particles that are dispersed and suspended in the matrix, the flow path through the matrix between and around the aerogel particles is much longer. Also, some of the heat is reflected at each interface between the matrix and the aerogel particles, hence decreasing the net heat flow.

In order that the invention may be more readily understood, reference will now be made, by way of example, to the accompanying drawings in which.

Figure 1:
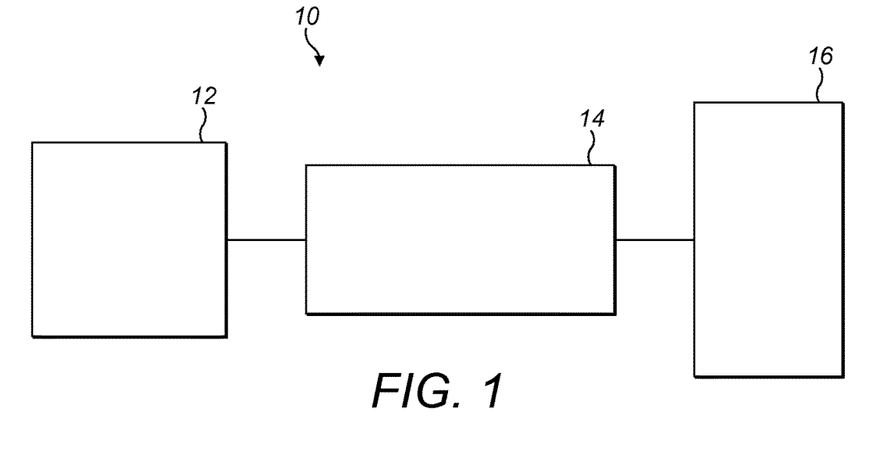
FIG. 1 is a schematic diagram of a mixing and injection-moulding system for use in the invention.

In FIG. 1 of the drawings, a mixing and injection-moulding system 10 for use in the invention comprises a mixing receptacle 12, an injection moulding machine 14 and a mould 16.

Figure 2:
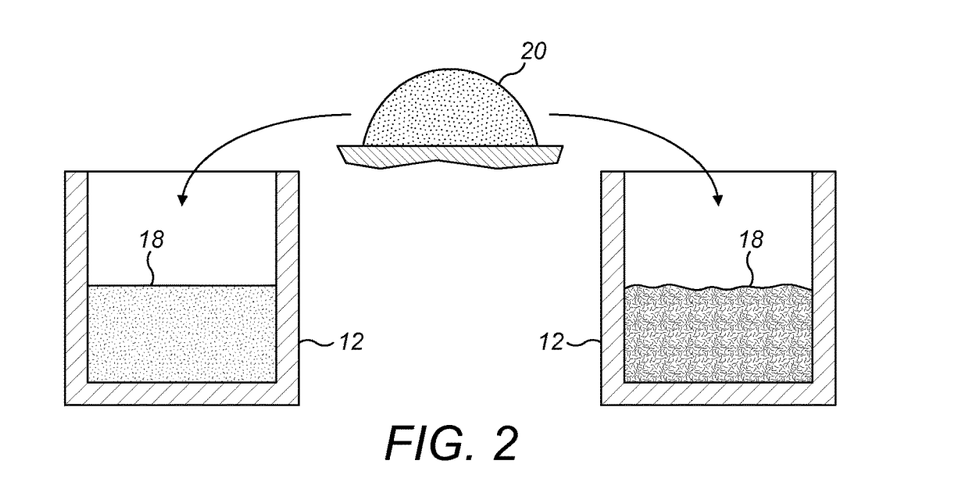
FIG. 2 is a schematic sectional side view of a mixing receptacle that is part of the system of FIG. 1.
Figure 3:
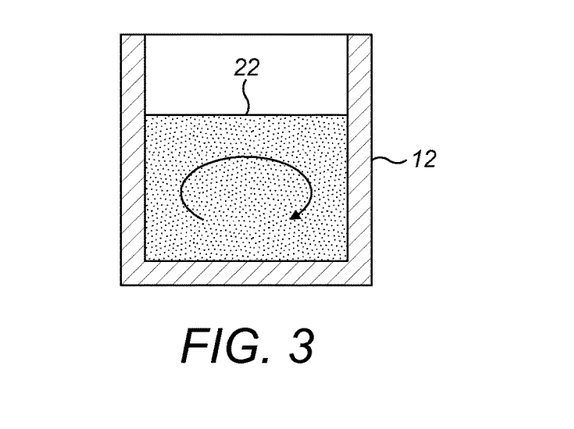
FIG. 3 is a schematic sectional side view of the mixing receptacle of FIG. 2, while mixing a mouldable thermally-efficient material of the invention.

FIGS. 2 and 3 show the interior of the mixing receptacle 12. In each case, the mixing receptacle contains a mass of polymer 18.

In FIG. 2, the mixing receptacle 12 shown on the left contains a liquid polymer 18, which may be either a thermoplastic polymer heated to a molten state or a thermoset resin that has not yet been cured or solidified. Conversely, the mixing receptacle 12 shown on the right of FIG. 2 contains grains or beads of a thermoplastic polymer 18 that has not yet been heated to melting point.

Centrally, FIG. 2 shows a filler 20 that comprises an aerogel or aerogel-based material in a particulate, powder or granular form. The aerogel material of the filler 20 may, for example, be a polyimide aerogel as disclosed in PCT/US2016/55775 or in U.S. Pat. No. 9,963,571. Polyimide aerogel is preferred for the filler 20 as it disperses well with other polymers, in particular an embedding matrix of the polymer 18, and has good mechanical strength. Particles of the filler 20 may, for example, have a diameter of between 5 μm and 500 μm and preferably of between 25 μm and 125 μm.

The filler 20 is poured into the mixing receptacle 12 and then is mixed with the polymer 18 in the mixing receptacle 12 at a temperature between −50° C. and 400° C. and at a pressure between $1 \times 10^{-7}$ and 350 MPa, as shown in FIG. 3, to form a mixture 22 in which the particles of the filler 20 are dispersed evenly through the mass of polymer 18. The filler 20 may, for example, constitute between 5% and 50% of the mixture 22 by volume and preferably constitutes between 10% and 30% of the mixture 22 by volume.

The mixture 22 is pumped or poured from the mixing receptacle 12 into the injection moulding machine 14. If the polymer 18 was initially in granular form, the polymer 18 could be melted in the mixing receptacle 12 or in the injection moulding machine 14, which further mixes the filler 20 with the polymer 18 before the mixture 22 is injected into the mould 16.

Figure 4:
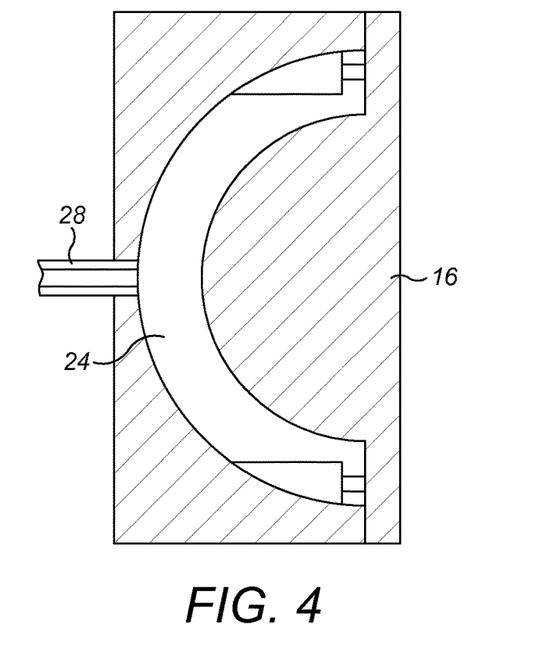
FIG. 4 is a schematic sectional side view of a mould that is part of the system of FIG. 1.
Figure 5:
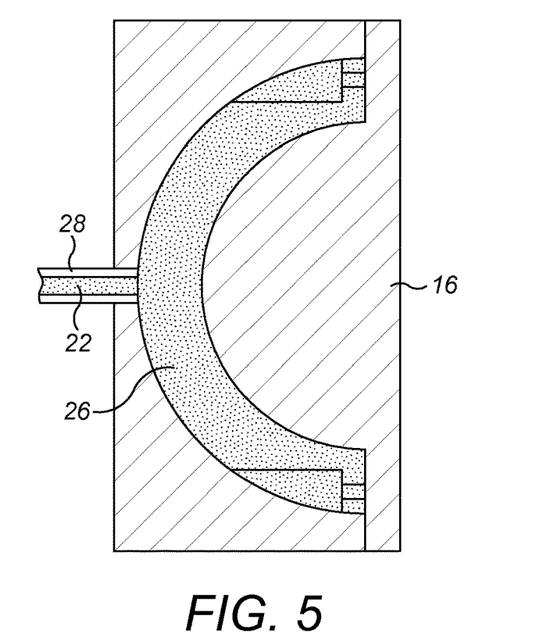
FIG. 5 corresponds to FIG. 4 but shows a cavity of the mould now filled with a charge of material mixed in the mixing receptacle as shown in FIG. 3, to form a thermally-efficient spacer component of the invention.
Figure 6:
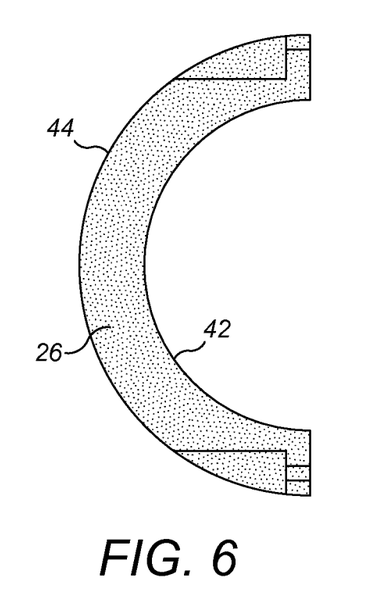
FIG. 6 is a schematic side view of the spacer component now removed from the mould cavity.

FIGS. 4 and 5 show the interior of the mould 16. The mould 16 defines a mould cavity 24, shown empty in FIG. 4, that in this example is substantially semi-annular to define a substantially semi-annular spacer component 26 as shown in FIG. 6. The mould cavity 24 communicates with the injection moulding machine 14 via a sprue 28, through which a charge of the mixture 22 is pumped into the mould 16 to fill the mould cavity 24 as shown in FIG. 5.

When the mould cavity 24 has been filled completely with the mixture 22, the mixture 22 is cured or solidified in the mould 16 to solidify the polymer 18. Where the polymer 18 is a thermoplastic, solidification may be achieved by cooling the mould 16 to cool and freeze the polymer 18 at a temperature between −50° C. and 200° C., and at a pressure between $1=10^{-7}$ and 350 MPa. Where the polymer 18 is a thermoset resin, solidification may be achieved by heating the mould 16 to a curing temperature between 35° C. and 250° C. and at a pressure between $1 \times 10^{-7}$ and 0.101 MPa and/or by allowing a pre-mixed hardener or catalyst component to solidify the resin at a temperature between 20° C.

and 250° C. and at a pressure between 1×10⁻⁷ and 0.101 MPa. The mould 16 is then opened or disassembled to extract the spacer component 26 as shown in FIG. 6.

Figure 7:
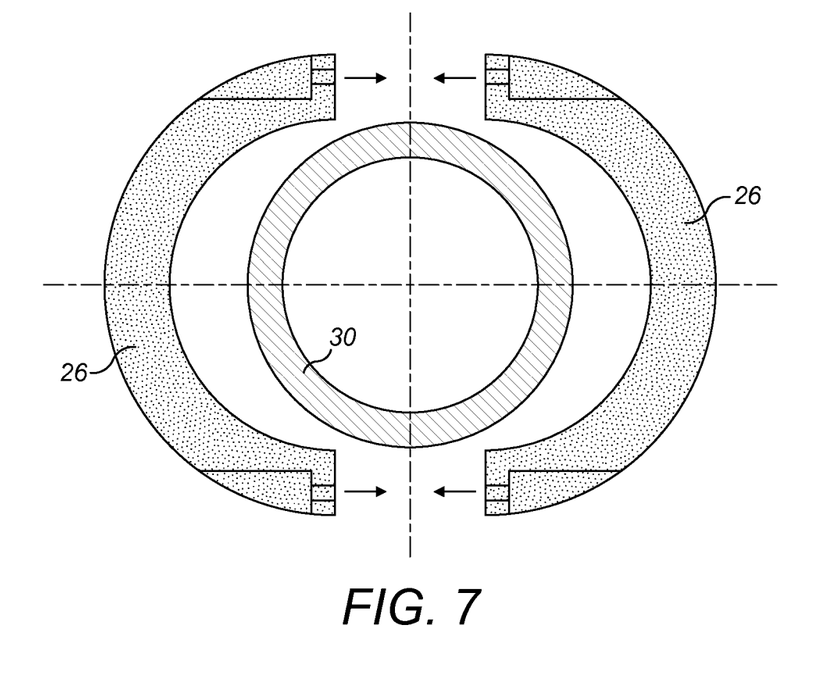
FIG. 7 is a schematic part-sectional view of two spacer components as shown in FIG. 6 being brought together in mutual opposition around an inner pipe of a PiP structure.
Figure 8:
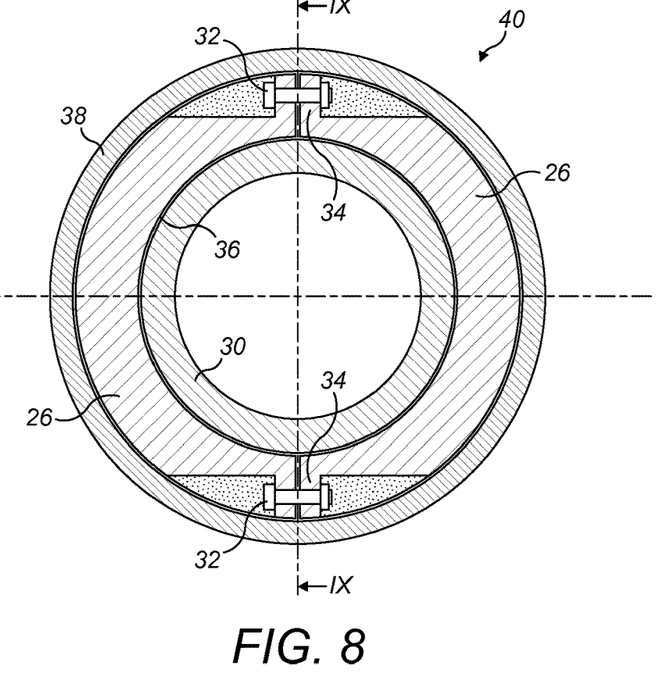
FIG. 8 is a schematic cross-sectional view on line VIII-VIII of FIG. 9 of the spacer components shown in FIG. 7 clamped together around the inner pipe of a PiP structure and within an outer pipe of the PiP structure.

The spacer component 26 shown in FIG. 6 has part-circular curvature, in this example being substantially semi-circular so that two opposed spacer components 26 can be brought together as shown in FIG. 7 to encircle an inner pipe 30 of a PiP structure. When assembled around the inner pipe 30 in this way, the spacer components 26 are clamped together by bolts 32 that extend through integral flanges 34. The spacer components 26 thereby cooperate to form an annular spacer 36 that extends substantially continuously around the inner pipe 30 and within an outer pipe 38 in the PiP structure 40 shown in FIG. 8.

It will be apparent that an inner face 42 of each spacer component 26 has a radius of curvature that is the same as, or slightly larger than, the external radius of curvature of the inner pipe 30. Conversely, an outer face 44 of each spacer component 26 has a radius of curvature that is slightly smaller than the internal radius of curvature of the outer pipe 38 of the PiP structure 40.

The spacer 36 defined by the spacer components 26 extends radially across almost the full width of the annulus 46 between the inner pipe 30 and the outer pipe 38.

However, a small clearance or gap is preferably left between the spacer 36 and the outer pipe 38 to reduce heat transmission by conduction.

Figure 9:
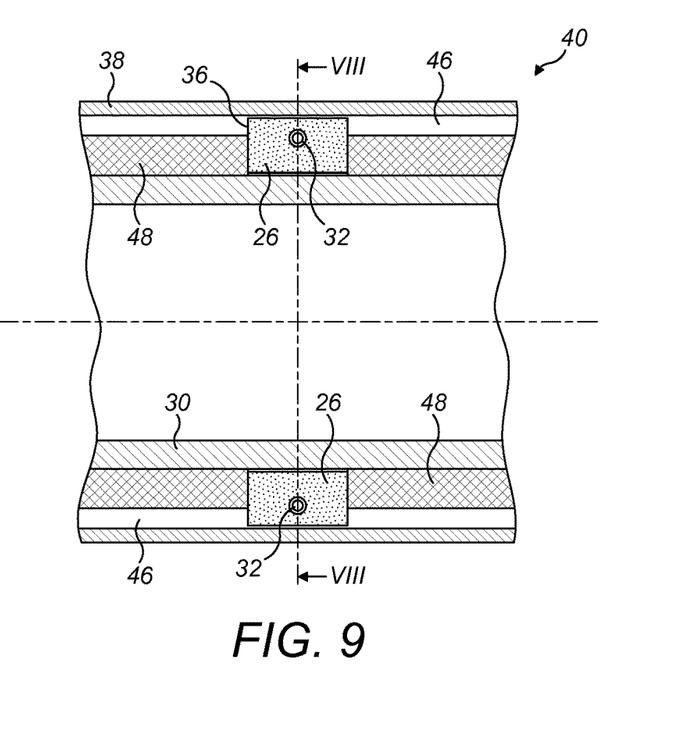
FIG. 9 is a schematic view in longitudinal section of the PiP structure, taken on line IX-IX of FIG. 8.

The longitudinal sectional view of the PiP structure 40 in FIG. 9 shows that the annulus 46 may also contain thermal insulation material 48, such as insulating blankets that encircle the inner pipe 30.

Figure 10:
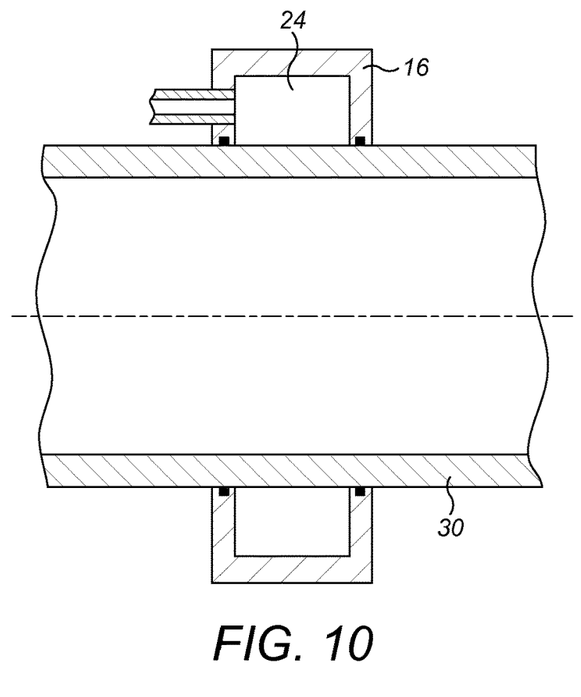
FIG. 10 is a schematic view in longitudinal section of a mould that encircles an inner pipe of a PiP structure.
Figure 11:
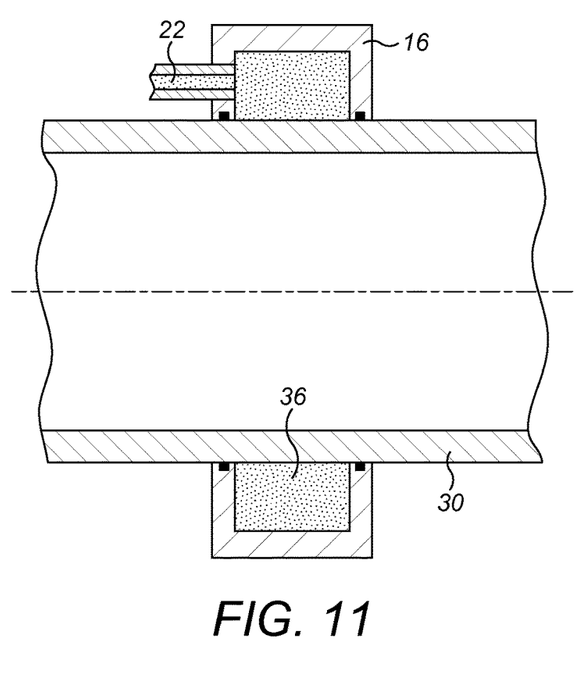
FIG. 11 corresponds to FIG. 10 but shows a cavity of the mould now filled with a charge of material mixed in the mixing receptacle as shown in FIG. 3, to mould a thermally-efficient spacer of the invention in situ around the inner pipe.

Turning next to FIGS. 10 and 11, these drawings show a variant of the invention in which like numerals are used for like features. In this variant, a spacer 36 is moulded in situ around an inner pipe 30 of a PiP using a mould 16 that encircles the inner pipe 30. The mould 16 is in two or more parts to allow its removal from the inner pipe 30 after the spacer 36 has been moulded and solidified. However, the parts of the mould 16 cooperate to define a continuous mould cavity 24 that encircles the inner pipe 30 and so defines an integral one-piece annular spacer 36 as shown in FIG. 11.

When the mould 16 has been removed from the inner pipe 30 to leave behind the spacer 36, the mould 16 may be moved along and reassembled around the inner pipe 30. In this way, the same mould 16 can be used repeatedly to mould other spacers 36 at respective positions spaced longitudinally along the inner pipe 30.

When the required spacers 36 have been moulded onto the inner pipe 30, the inner pipe 30 can be wrapped with insulating material between the spacers 36 like that shown in FIG. 9. The resulting assembly can then be inserted into an outer pipe of a PiP structure like that shown in FIGS. 8 and 9.

Figure 12:
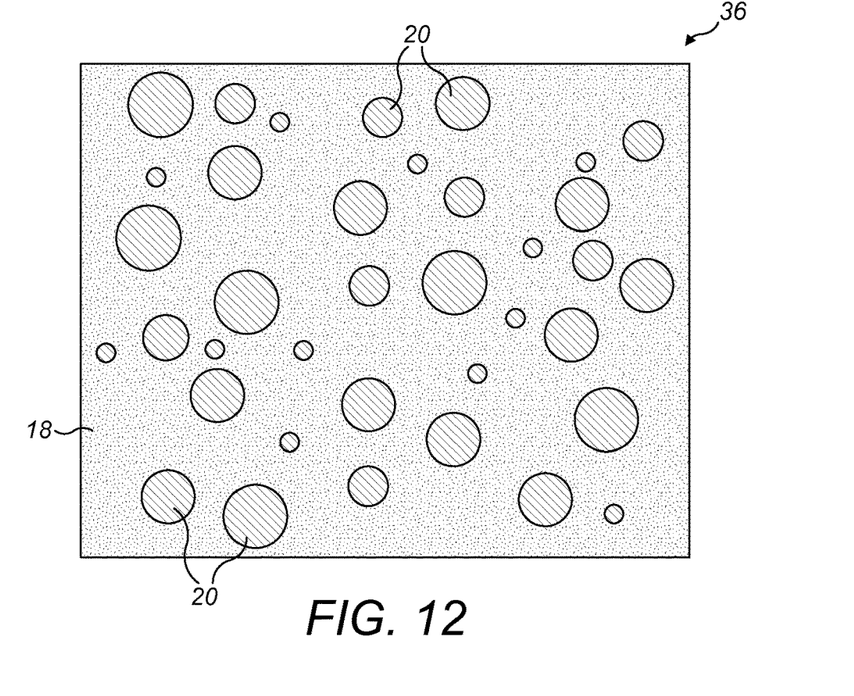
FIG. 12 is an enlarged sectional view of a thermally-efficient material of the invention, showing aerogel particles suspended in a polymer matrix.
Figure 13:
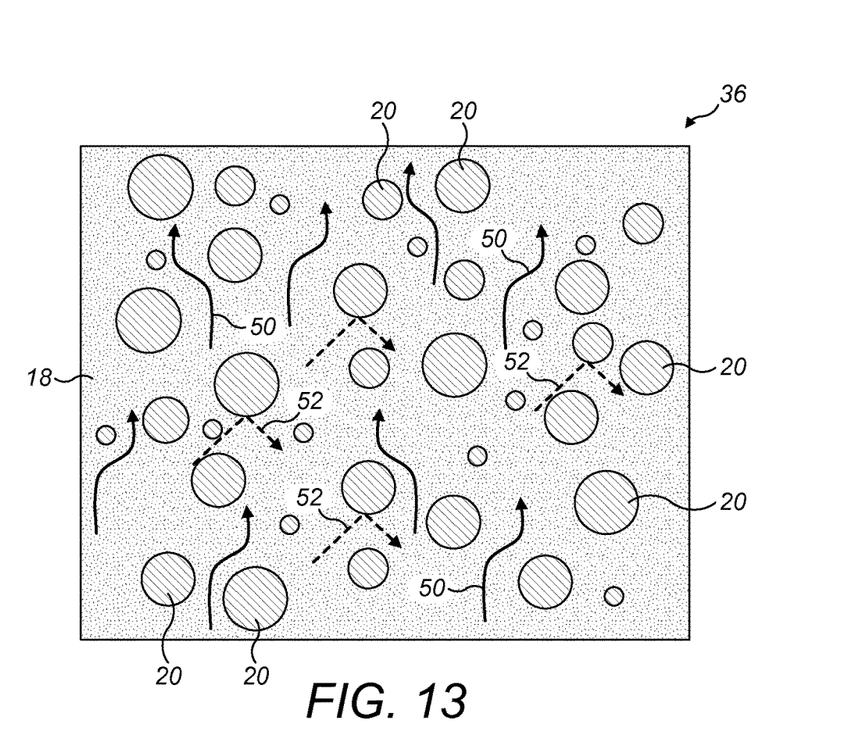
FIG. 13 corresponds to FIG. 12 but shows heat flowing through the matrix and being reflected at interfaces between the particles and the matrix.

Turning finally to FIGS. 12 and 13 of the drawings, these enlarged detail views show the microstructure of the thermally-efficient material of the invention that results when the mixture 22 is solidified to make a spacer 36. It will be apparent that embedded particles or granules of the aerogel filler 20, of various sizes, are suspended in a solid, dense matrix of the polymer 18.

In use of the spacer 36 in a PIP structure, heat will typically flow from a radially inner side of the spacer 36 to a radially outer side of the spacer 36. Such a flow of heat is represented by the arrows in FIG. 13, which generally point upwardly as illustrated. It will be apparent that the heat transfer paths through the matrix of the polymer 18 around and between the particles of the aerogel filler 20 are convoluted, indirect and therefore lengthy, as shown by arrows 50. It will also be apparent that some heat radiation is reflected back, or at least substantially diverted, by reflection at the interfaces between the polymer 18 and the particles of the filler 20, as shown by arrows 52. Both of these factors hinder the flow of heat through the spacer 36 and so are to the benefit of thermal insulation.

The particles of the filler 20 could have irregular shapes and so need not have the spherical shapes that are shown schematically in FIGS. 12 and 13. Nor is it essential that the particles of the filler 20 are of substantially different sizes as shown. However, if those particles are of substantially different sizes, interstices between larger particles may be filled more effectively with smaller particles so as to optimise the volume ratio of the filler 20 to the polymer 18.

Many other variations are possible within the inventive concept. For example, mixing between the filler and the polymer matrix material could be effected solely within an injection moulding machine. A separate mixing receptacle upstream of the injection moulding machine is therefore optional.

The spacer could be moulded by a process other than injection moulding, such as casting involving pouring a liquid mixture into a mould cavity under no, or low, pressure rather than injecting the mixture into the cavity under high pressure.

Three or more spacer components could be assembled together to form a spacer that encircles the inner pipe of a PiP system.

The invention claimed is:

1. A method of manufacturing a spacer for a pipe-in-pipe system, the method comprising:
   mixing a filler of aerogel particles with a polymer to form a mixture in which the aerogel particles are dispersed in the polymer; and
   moulding the mixture and solidifying the polymer to form the spacer or a component of the spacer, in which the dispersed aerogel particles are suspended in a matrix of the solidified polymer, wherein the polymer is a thermoset and is solidified at a temperature of from 30° C. to 250° C.

2. The method of claim 1, comprising injection-moulding the mixture.

3. The method of claim 1, comprising pouring the mixture into a mould cavity.

4. The method of claim 1, comprising mixing the aerogel particles with the polymer when the polymer is in a liquid form.

5. The method of claim 4, comprising heating and/or catalysing the polymer when solidifying the polymer after moulding the mixture.

6. The method of claim 4, comprising melting the polymer and mixing the aerogel particles with the molten polymer.

7. The method of claim 1, comprising mixing the aerogel particles with the polymer when the polymer is in a granular form, and then melting the polymer.

8. The method of claim 6 comprising cooling the mixture when solidifying the polymer after moulding the mixture.

9. The method of claim 1, wherein the aerogel particles comprise polyimide aerogel particles.

10. The method of claim 1, wherein the aerogel particles have a diameter of between 5 μm and 50 μm.

11. The method of claim 10, wherein the aerogel particles have a diameter of between 25 μm and 125 μm.

12. The method of claim 1, wherein the aerogel particles constitute between 5% and 50% of the mixture by volume.

13. The method of claim 12, wherein the aerogel particles constitute between 10% and 30% of the mixture by volume.

14. The method of claim 1, wherein the filler is mixed with the polymer at a temperature of from −50° C. to 400° C.

15. The method of claim 14, the filler is mixed with the polymer at a temperature of from −50° C. to 200° C.

16. The method of claim 1, wherein the filler is mixed with the polymer at a pressure of from $1\times10^{-7}$ MPa to 350 MPa.

17. The method of claim 16, wherein the filler is mixed with the polymer at a pressure of from $1\times10^{-7}$ MPa to 0.101 MPa.

18. The method of claim 1, wherein the polymer is solidified at a pressure of from $1\times10^{-7}$ MPa to 350 MPa.

19. The method of claim 18, wherein the polymer is solidified at a pressure of from $1\times10^{-7}$ MPa to 0.101 MPa.

20. The method of claim 1, wherein the polymer is selected from: epoxy, nylon, polyester, vinyl ester, polypropylene, or dicyclopentadiene.

21. A pipe-in-pipe structure made by a method as defined in claim 1.

* * * * *